United States Patent [19]

Haijkens

[11] Patent Number: 4,574,212

[45] Date of Patent: Mar. 4, 1986

[54] COMMUTATOR END DUST SEAL FOR AN ELECTRIC MOTOR

[75] Inventor: Bernardus Haijkens, Drachten, Netherlands

[73] Assignee: U.S. Philips Corporation, New York, N.Y.

[21] Appl. No.: 712,323

[22] Filed: Mar. 14, 1985

Related U.S. Application Data

[63] Continuation of Ser. No. 558,067, Dec. 5, 1983.

[30] Foreign Application Priority Data

Dec. 9, 1982 [NL] Netherlands ........................ 8204764

[51] Int. Cl.[4] ............................................. H02K 5/10

[52] U.S. Cl. ..................................... 310/88; 310/237; 384/138

[58] Field of Search ........................... 310/88, 90, 237; 308/187.1; 384/138, 144; 277/212 C

[56] References Cited

U.S. PATENT DOCUMENTS

| | | | |
|---|---|---|---|
| 2,256,870 | 9/1941 | Schaffer | 310/88 X |
| 2,981,573 | 4/1961 | Reuter | 384/138 |
| 3,731,126 | 5/1973 | Hagenlocher et al. | 310/88 X |

FOREIGN PATENT DOCUMENTS

| | | | |
|---|---|---|---|
| 2448522 | 5/1975 | Fed. Rep. of Germany | 310/88 |
| 2399754 | 4/1979 | France | 310/88 |

*Primary Examiner*—Mark O. Budd
*Attorney, Agent, or Firm*—David R. Treacy

[57] ABSTRACT

An electric motor having a bearing and a commutator with brushes on one end of the rotor shaft, and a dust seal for the bearing formed by a sleeve forming part of and extending axially from the bearing into an annular recess in the commutator. The sleeve defines an open-ended conical space around the shaft, tapering to the bearing.

1 Claim, 1 Drawing Figure

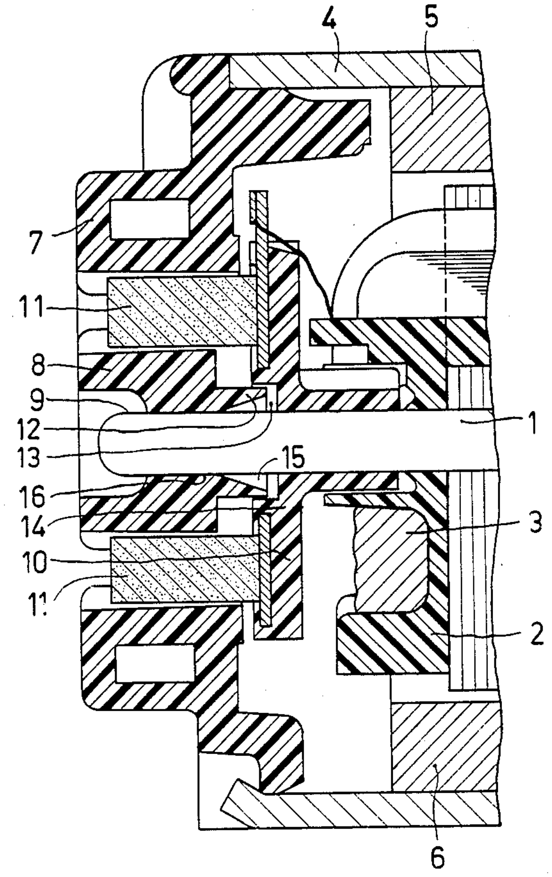
4
5
7
11
8
9
12
13
15
1
16
14
3
10
11
2
6

COMMUTATOR END DUST SEAL FOR AN ELECTRIC MOTOR

This is a continuation of application Ser. No. 558,067 filed Dec. 5, 1983.

The invention relates to an electric motor comprising a stator, a rotor with a rotor shaft and a commutator, with brushes on one end of the rotor shaft, which end of the rotor shaft is journalled in a bearing.

Such a motor is disclosed in, for example, Netherlands Patent Application No. 7,113,387 to which U.S. Pat. No. 3,824,416 corresponds. The brushes are generally made of carbon and will produce dust as a result of the friction between the brushes and the commutator. The dust which penetrates the bearing will shorten the life of the bearing.

It is the object of the invention to mitigate this problem by means of a construction which is characterized in that the bearing and the commutator have relatively rotatable parts which cooperate with one another to form a dust seal for the bearing.

One embodiment of the invention is characterized in that one of the cooperating parts is a sleeve which surrounds the shaft and extends axially into an annular recess in the other part.

Another embodiment is characterized in that one of the cooperating parts is a sleeve which surrounds the shaft and is formed with the bearing as a one-piece unitary element. The sleeve inner surface defines an open-ended frusto-conical space around the shaft, which space tapers towards the interior of the bearing.

An embodiment of the invention will now be described in more detail, by way of example, with reference to the drawing.

The drawing shows a part of a longitudinal section along the rotor shaft 1. A rotor 2 comprising coils 3 is fixed on the rotor shaft. The stator comprises a cylindrical shell 4 and permanent magnets 5 and 6. The cylindrical shell is closed by a bearing plate 7 with a bearing 8 for the end 9 of the rotor shaft. The end 9 carries a commutator 10. In the bearing plate 7 carbon brushes 11 are arranged, which brushes have sliding contact with the commutator 10 for the current supply to the coil 3.

Part of the bearing 8 is constructed as a sleeve 12 which surrounds the rotor shaft and extends axially into a concentric annular recess 13 in the central portion 14 of the commutator 10. The sleeve 12 may have a slight clearance within the recess 13, to avoid friction losses.

This provides a satisfactory seal for the bearing 8 against the entry of dust which originates at, for example, the commutator 10, or against the entry of other contaminants. In this way the life of the bearing is extended substantially.

The sleeve may alternatively form part of the commutator, a recess to receive the sleeve being formed in the bearing. This recess may be formed as a concentric groove.

Both the sleeve and the groove can be formed simply, especially if the relevant parts are injection-moulded from a plastics.

In the embodiment shown, in which the sleeve forms part of the bearing, the sleeve is shaped internally to form a frusto-conical space 15 around the shaft, which space tapers towards the interior of the bearing. It has been found that such a shape of the space 15 has a favorable influence on the supply of lubricant from this space to the interior 16 of the bearing.

The construction in accordance with the invention also has the advantage that no bearing lubricant can be flung onto the commutator by the shaft.

What is claimed is:

1. An electric motor comprising a stator, a rotor having a rotor shaft, a bearing journalled around one end of the shaft, a commutator on said one shaft end, and brushes engaging said commutator, characterized by comprising a sleeve extending axially from and formed with said bearing as a one-piece unitary element, said sleeve having an inner surface defining an open-ended frusto-conical space surrounding the shaft and tapering toward the interior of the bearing, said commutator having an annular recess and said sleeve extending into said recess to form a dust seal.

* * * * *